United States Patent
Ogawa et al.

(10) Patent No.: US 9,337,506 B2
(45) Date of Patent: *May 10, 2016

(54) FUEL CELL MODULE

(71) Applicant: HONDA MOTOR CO., LTD., Tokyo (JP)

(72) Inventors: Tetsuya Ogawa, Wako (JP); Yuki Yoshimine, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 30 days.

This patent is subject to a terminal disclaimer.

(21) Appl. No.: 14/347,905

(22) PCT Filed: Dec. 19, 2012

(86) PCT No.: PCT/JP2012/083759
§ 371 (c)(1),
(2) Date: Mar. 27, 2014

(87) PCT Pub. No.: WO2013/114774
PCT Pub. Date: Aug. 8, 2013

(65) Prior Publication Data
US 2014/0242484 A1 Aug. 28, 2014

(30) Foreign Application Priority Data
Jan. 30, 2012 (JP) .................. 2012-017305

(51) Int. Cl.
H01M 8/06 (2006.01)
H01M 8/24 (2006.01)
H01M 8/04 (2006.01)

(52) U.S. Cl.
CPC ........ *H01M 8/0618* (2013.01); *H01M 8/04022* (2013.01); *H01M 8/04074* (2013.01); *H01M 8/0625* (2013.01); *H01M 8/0631* (2013.01); *H01M 8/2425* (2013.01); *Y02E 60/50* (2013.01)

(58) Field of Classification Search
CPC ....... H01M 8/04; H01M 8/06; H01M 8/0618; H01M 8/0625; H01M 8/0631; H01M 8/2425; H01M 8/04022; H01M 8/04074
See application file for complete search history.

(56) References Cited

U.S. PATENT DOCUMENTS

2001/0009732 A1  7/2001 Schuler
2003/0096147 A1  5/2003 Badding et al.
(Continued)

FOREIGN PATENT DOCUMENTS

JP  2000-223144  8/2000
JP  2001-236980  8/2001
(Continued)

OTHER PUBLICATIONS

U.S. Office Action dated Jul. 8, 2015 from co-pending U.S. Appl. No. 14/347,919, 21 pages.
(Continued)

Primary Examiner — Sarah A Slifka
Assistant Examiner — Brian Ohara
(74) Attorney, Agent, or Firm — Rankin, Hill & Clark LLP

(57) ABSTRACT

A fuel cell module includes a first area where an exhaust gas combustor and a start-up combustor are provided, an annular second area disposed around the first area where a heat exchanger is provided, an annular third area disposed around the second area where a reformer is provided, and an annular fourth area disposed around the third area where an evaporator is provided. The fuel cell module includes a first partition plate having first combustion gas holes, a second partition plate having second combustion gas holes, and a third partition plate having third combustion gas holes.

8 Claims, 15 Drawing Sheets

(56) References Cited

U.S. PATENT DOCUMENTS

2009/0208800 A1* 8/2009 Ogawa .................... 429/26
2010/0021784 A1   1/2010 Fourmigue

FOREIGN PATENT DOCUMENTS

| JP | 2002-284506 | 10/2002 |
| --- | --- | --- |
| JP | 2003-229151 | 8/2003 |
| JP | 2003-327405 | 11/2003 |
| JP | 2004-288434 | 10/2004 |
| JP | 2008-108691 | 5/2008 |
| JP | 2008-222530 | 9/2008 |
| JP | 2010-504607 | 2/2010 |

OTHER PUBLICATIONS

U.S. Office Action dated Jul. 7, 2015, issued in co-pending U.S. Appl. No. 14/347,909, 22 pages.

This application is co-pending with U.S. Appl. No. 14/347,925, filed Mar. 27, 2014, U.S. Appl. No. 14/347,909, filed Mar. 27, 2014, and U.S. Appl. No. 14/347,919, filed Mar. 27, 2014.

Japanese Office Action dated Jul. 7, 2015 corresponds to co-pending U.S. Appl. No. 14/347,919, with partial English translation, 5 pages.

Japanese Office Action dated Aug. 11, 2015, Application No. 2012-017304, partial English translation included.

* cited by examiner

FUEL CELL MODULE

TECHNICAL FIELD

The present invention relates to a fuel cell module including a fuel cell stack formed by stacking a plurality of fuel cells for generating electricity by electrochemical reactions between a fuel gas and an oxygen-containing gas.

BACKGROUND ART

Typically, a solid oxide fuel cell (SOFC) employs a solid electrolyte made of an ion-conductive oxide such as stabilized zirconia. The electrolyte is interposed between an anode and a cathode to form an electrolyte electrode assembly (hereinafter also referred to as an MEA). The electrolyte electrode assembly is interposed between separators. During use thereof, generally, a predetermined number of the electrolyte electrode assemblies and the separators are stacked together to form a fuel cell stack.

As a system including this type of fuel cell stack, for example, the fuel cell battery disclosed in Japanese Laid-Open Patent Publication No. 2001-236980 (hereinafter referred to as conventional technique 1) is known. As shown in FIG. 13, the fuel cell battery includes a fuel cell stack $1a$, and a heat insulating sleeve $2a$ provided at one end of the fuel cell stack $1a$. A reaction device $4a$ is provided in the heat insulating sleeve $2a$. The reaction device $4a$ includes a heat exchanger $3a$.

In the reaction device $4a$, as a treatment for a liquid fuel, partial oxidation reforming, which does not use water, is performed. After the liquid fuel is evaporated by an exhaust gas, the liquid fuel passes through a feeding point $5a$, which forms part of the heat exchanger $3a$. The fuel contacts an oxygen carrier gas heated by the exhaust gas to induce partial oxidation reforming, and thereafter, the fuel is supplied to the fuel cell stack $1a$.

Further, as shown in FIG. 14, the solid oxide fuel cell disclosed in Japanese Laid-Open Patent Publication No. 2010-504607 (PCT) (hereinafter referred to as conventional technique 2) has a heat exchanger $2b$ including a cell core $1b$. The heat exchanger $2b$ heats air at the cathode utilizing waste heat.

Further, as shown in FIG. 15, the fuel cell system disclosed in Japanese Laid-Open Patent Publication No. 2004-288434 (hereinafter referred to as conventional technique 3) includes a first area is having a vertically extending columnar shape, and an annular second area $2c$ disposed around the first area $1c$, an annular third area $3c$ disposed around the second area $2c$, and an annular fourth area $4c$ disposed around the third area $3c$.

A burner $5c$ is provided in the first area $1c$, and a reforming pipe $6c$ is provided in the second area $2c$. A water evaporator $7c$ is provided in the third area $3c$, and a CO shift converter $8c$ is provided in the fourth area $4c$.

SUMMARY OF INVENTION

In conventional technique 1, at the time of performing partial oxidation reforming in the reaction device $4a$, heat from the exhaust gas is used for heating the liquid fuel and the oxygen carrier gas. Therefore, the quantity of heat required for heating the oxygen-containing gas supplied to the fuel cell stack $1a$ tends to be insufficient. Thus, a thermally self-sustaining operation cannot be performed effectively.

Further, in conventional technique 2, exhaust heat is used for heating the cathode air supplied to the cell core $1b$. Therefore, the heat quantity required for reforming or heating of the fuel gas supplied to the cell core $1b$ tends to be insufficient. Thus, together with reforming, a thermally self-sustaining operation cannot be performed suitably.

Further, in conventional technique 3, heat from the combustion gas from the burner $5c$ is used for reforming the fuel. Therefore, the oxygen-containing gas supplied to the fuel cell may not be heated sufficiently, and thus, a thermally self-sustaining operation cannot be performed effectively.

The present invention has been made to solve the aforementioned problems of this type, and has the object of providing a fuel cell module having a simple and compact structure, which makes it possible to improve heat efficiency and to facilitate a thermally self-sustaining operation.

The present invention relates to a fuel cell module comprising a fuel cell stack formed by stacking fuel cells for generating electricity by electrochemical reactions between a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising temperature of the oxygen-containing gas by heat exchange with combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to thereby produce the combustion gas, and a start-up combustor for combusting the raw fuel and the oxygen-containing gas to thereby produce the combustion gas.

The fuel cell module further comprises a first area where the exhaust gas combustor and the start-up combustor are provided, an annular second area disposed around the first area where one of the reformer and the heat exchanger is provided, an annular third area disposed around the second area where another of the reformer and the heat exchanger is provided, an annular fourth area disposed around the third area where the evaporator is provided, a first partition plate provided between the first area and the second area, a second partition plate provided between the second area and the third area, and a third partition plate provided between the third area and the fourth area.

First combustion gas holes, second combustion gas holes, and third combustion gas holes are formed in the first partition plate, the second partition plate, and the third partition plate, respectively, for thereby allowing the combustion gas to flow through the first area, the second area, the third area, and the fourth area.

In the present invention, the annular second area is disposed at the center around the first area where the exhaust gas combustor and the start-up combustor are provided, the annular third area is disposed around the second area, and the annular fourth area is disposed around the third area. In such a structure, hot temperature equipment with a large heat demand can be provided on the inside, and low temperature equipment with a small heat demand can be provided on the outside. Accordingly, an improvement in heat efficiency is achieved, and a thermally self-sustaining operation is facilitated. Further, a simple and compact structure is achieved.

The first partition plate, the second partition plate, and the third partition plate separate the first area, the second area, the third area, and the fourth area from each other. Further, the first combustion gas holes, the second combustion gas holes, and the third combustion gas holes are formed in the first partition plate, the second partition plate, and the third partition plate, respectively, for allowing the combustion gas to flow through the first area, the second area, the third area, and the fourth area.

In such a structure, blowing of the combustion gas can be suppressed suitably, a further improvement in heat efficiency is achieved, and a thermally self-sustaining operation can be facilitated reliably.

Further, positions of the first combustion gas holes, the second combustion gas holes, and the third combustion gas holes can be determined depending on a priority of any one of heat exchange efficiency, durability, and a reduction in size or the like with respect to the second, third, and fourth areas. Accordingly, the target heat exchange efficiency can be determined freely, and a wider variety of designs becomes available.

DESCRIPTION OF EMBODIMENTS

Figure 1:
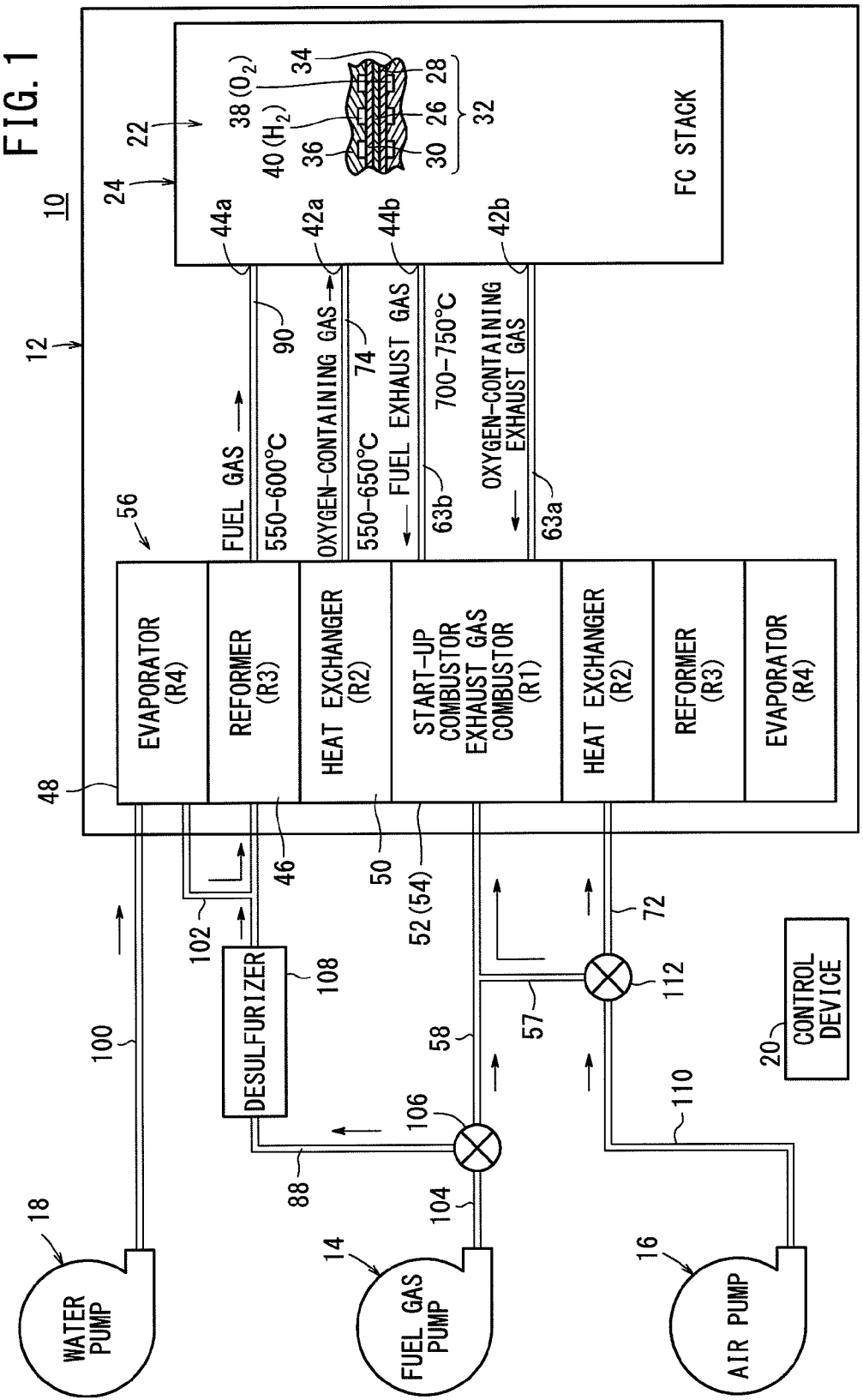
FIG. 1 is a diagram schematically showing the structure of a fuel cell system including a fuel cell module according to a first embodiment of the present invention.

As shown in FIG. 1, a fuel cell system 10 includes a fuel cell module 12 according to a first embodiment of the present invention. The fuel cell system 10 is used in various applications, including stationary and mobile applications. For example, the fuel cell system 10 may be mounted on a vehicle.

The fuel cell system 10 includes the fuel cell module (SOFC module) 12 for generating electrical energy used for power generation by electrochemical reactions between a fuel gas (a gas produced by mixing hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or a horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of an ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. Various types of conventional SOFCs can be adopted as the fuel cell 22.

The operating temperature of the fuel cell 22 is high, on the order of several hundred ° C. Methane in the fuel gas is reformed at the anode 30 to obtain hydrogen and CO, and hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of water vapor and raw fuel which chiefly contains hydrocarbon (e.g., city gas) to thereby produce a fuel gas that is supplied to the fuel cell stack 24, an evaporator 48 for evaporating water and supplying water vapor to the reformer 46, a heat exchanger 50 for raising the temperature of the oxygen-containing gas through heat exchange with a combustion gas, and supplying the oxygen-containing gas to the fuel cell stack 24, an exhaust gas combustor 52 for combusting the fuel gas, which is discharged as a fuel exhaust gas from the fuel cell stack 24, and the oxygen-containing gas, which is discharged as an oxygen-containing exhaust gas from the fuel cell stack 24, to thereby produce the combustion gas, and a start-up combustor 54 for combusting the raw fuel and the oxygen-containing gas to thereby produce the combustion gas.

Basically, the fuel cell module 12 is made up of the fuel cell stack 24 and FC (fuel cell) peripheral equipment 56. FC peripheral equipment 56 includes the reformer 46, the evaporator 48, the heat exchanger 50, the exhaust gas combustor 52, and the start-up combustor 54.

Figure 2:
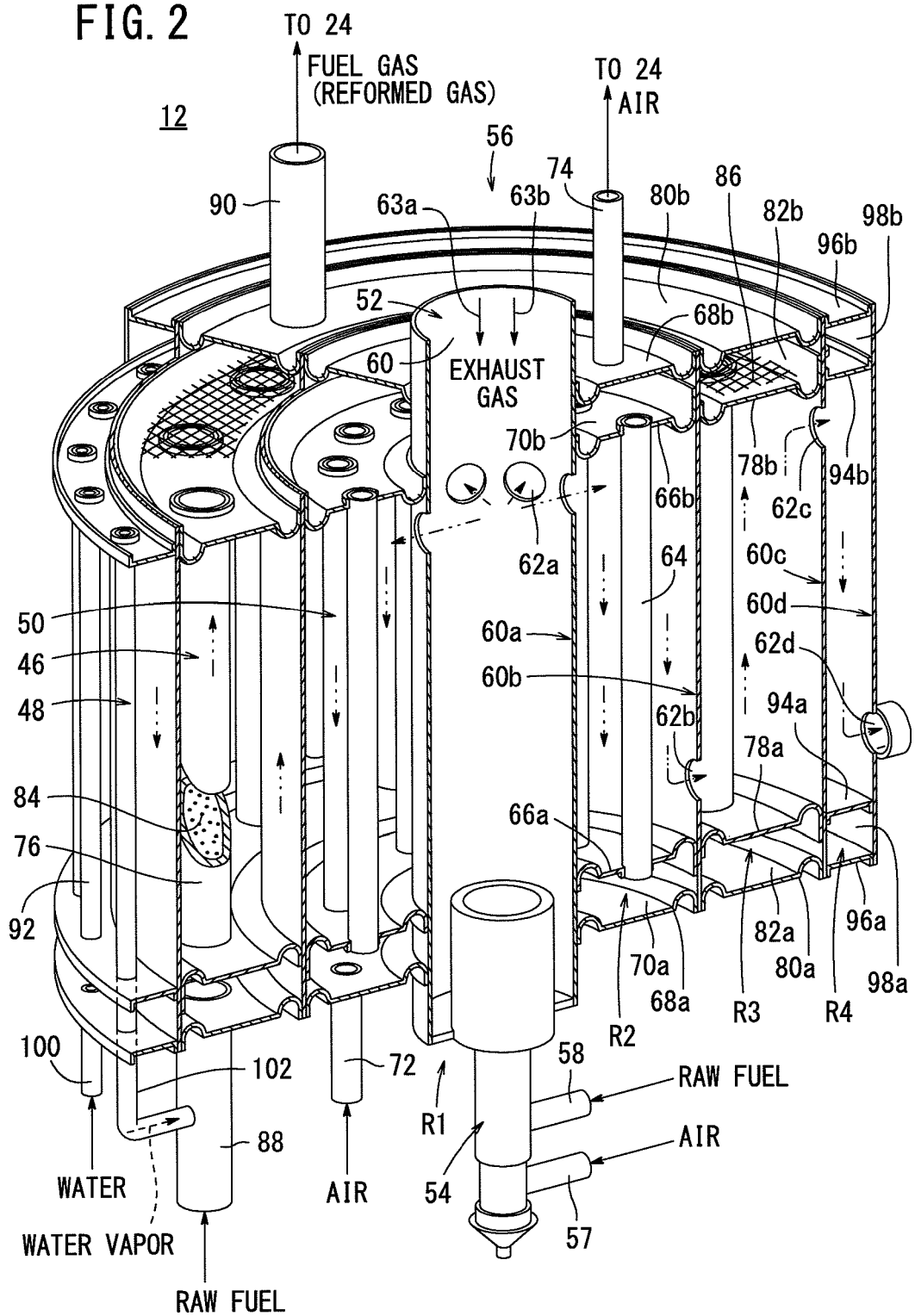
FIG. 2 is a perspective view with partial omission showing FC peripheral equipment of the fuel cell module.

As shown in FIG. 2, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
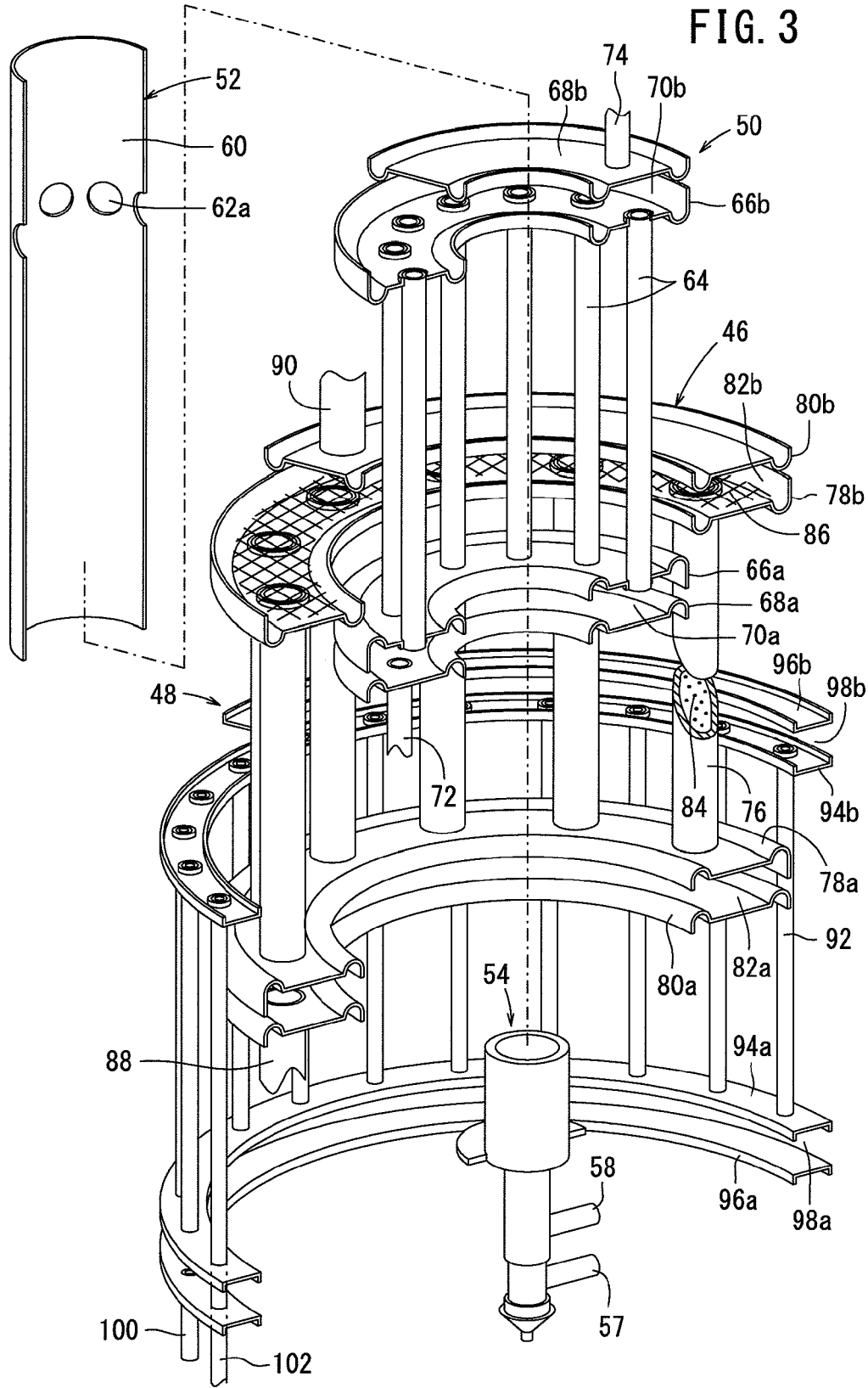
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 includes an ejector function for generating a negative pressure for sucking raw fuel in the raw fuel supply pipe 58 by flow of air supplied from the air supply pipe 57.

Figure 4:
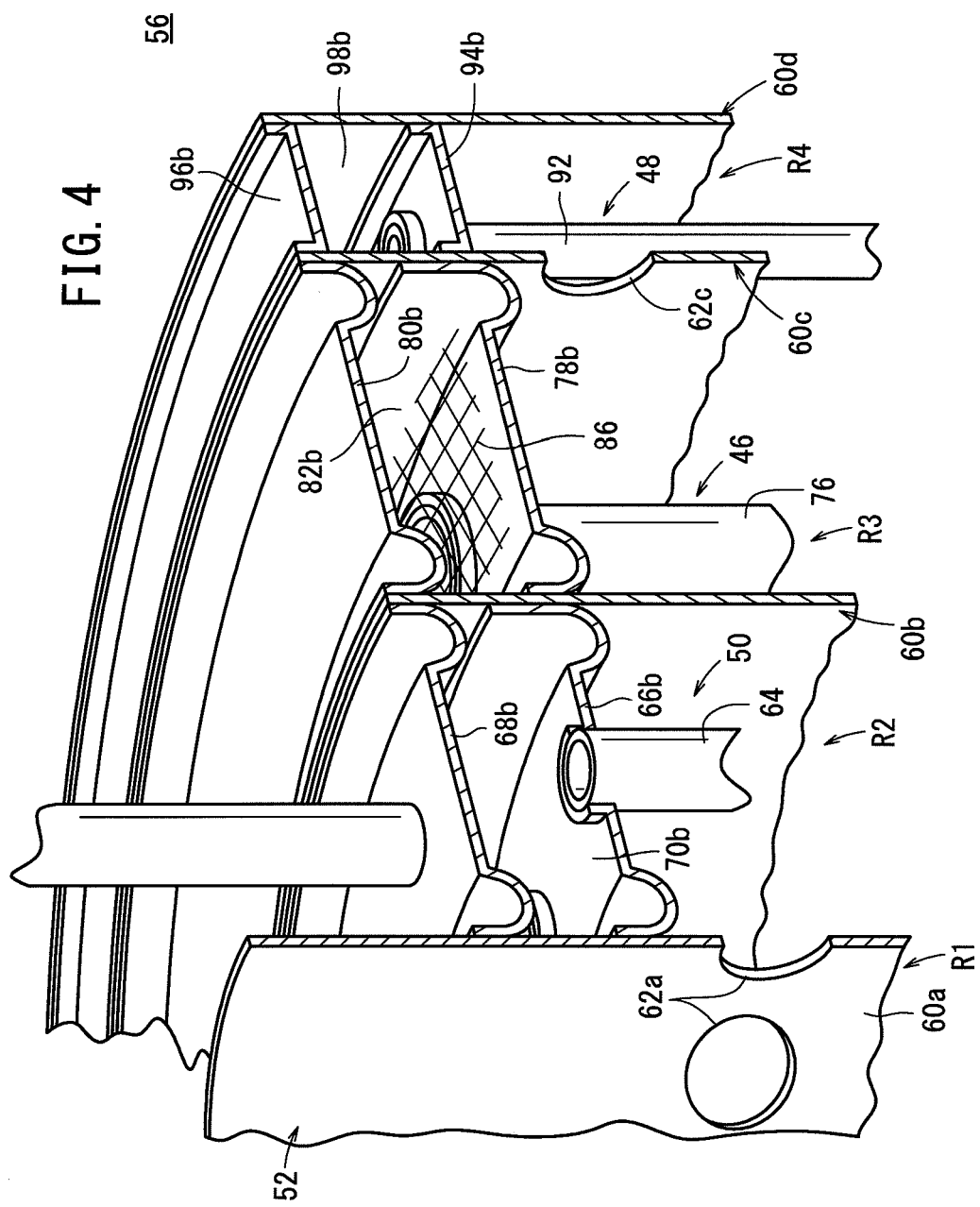
FIG. 4 is an enlarged perspective view showing main components of the FC peripheral equipment.

As shown in FIGS. 2 and 4, the FC peripheral equipment 56 includes a first partition plate 60a provided between the first area R1 and the second area R2, a second partition plate 60b provided between the second area R2 and the third area R3, and a third partition plate 60c provided between the third area R3 and the fourth area R4. Also, a fourth partition plate 60d is disposed around the fourth area R4 as an outer plate.

As shown in FIGS. 2 and 3, the exhaust gas combustor 52 is provided inside the first partition plate 60a that contains the start-up combustor 54. The first partition plate 60a has a cylindrical shape. A plurality of first combustion gas holes 62a are formed along an outer circumferential portion of the first partition plate 60a, adjacent to an end of the first partition plate 60a close to the fuel cell stack 24.

A plurality of second combustion gas holes 62b are formed adjacent to an end of the second partition plate 60b opposite from the fuel cell stack 24. A plurality of third combustion gas holes 62c are formed adjacent to an end of the third partition plate 60c close to the fuel cell stack 24. A plurality of fourth combustion gas holes 62d are formed adjacent to an end of the fourth partition plate 60d opposite from the fuel cell stack 24. The combustion gas is discharged to the exterior through the fourth combustion gas holes 62d.

One end of an oxygen-containing exhaust gas channel 63a and one end of an fuel exhaust gas channel 63b are provided respectively on the first partition plate 60a. Combustion gas is produced inside the first partition plate 60a by a combustion reaction between the fuel gas (more specifically, a fuel exhaust gas) and the oxygen-containing gas (more specifically, an oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 2 and 3, the heat exchanger 50 includes a plurality of heat exchange pipes (heat transmission pipes) 64 disposed around the first partition plate 60a. The heat exchange pipes 64 are fixed to a first inner ring 66a at one end (i.e., the other end opposite from the fuel cell stack 24; hereinafter, in the same manner, the other end opposite from the fuel cell stack 24 is referred to as "one end"). The heat exchange pipes 64 are fixed to a first inner ring 66b at the other end (i.e., one end closer to the fuel cell stack 24; hereinafter, in the same manner, the one end closer to the fuel cell stack 24 is referred to as an "other end").

A first outer ring 68a is provided on the outside of the first inner ring 66a, and a first outer ring 68b is provided on the outside of the first inner ring 66b. The first inner rings 66a, 66b and the first outer rings 68a, 68b are fixed respectively to the outer circumferential surface of the first partition plate 60a, and to the inner circumferential surface of the second partition plate 60b.

An annular oxygen-containing gas supply chamber 70a is formed between the first inner ring 66a and the first outer ring 68a, and oxygen-containing gas is supplied to the oxygen-containing gas supply chamber 70a. An annular oxygen-containing gas discharge chamber 70b is formed between the first inner ring 66b and the first outer ring 68b, and heated oxygen-containing gas is discharged into the oxygen-containing gas discharge chamber 70b (see FIGS. 2 to 4). Opposite ends of each of the heat exchange pipes 64 open respectively into the oxygen-containing gas supply chamber 70a and the oxygen-containing gas discharge chamber 70b.

An oxygen-containing gas supply pipe 72 is connected to the oxygen-containing gas supply chamber 70a. One end of an oxygen-containing gas channel 74 is connected to the oxygen-containing gas discharge chamber 70b, whereas the other end of the oxygen-containing gas channel 74 is connected to the oxygen-containing gas supply passage 42a of the fuel cell stack 24 (see FIG. 1).

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel), to thereby produce by steam reforming a fuel gas chiefly containing methane ($CH_4$), hydrogen, and CO. The operating temperature of the reformer 46 is several hundred °C.

As shown in FIGS. 2 and 3, the reformer 46 includes a plurality of reforming pipes (heat transmission pipes) 76 disposed around the heat exchanger 50. The reforming pipes 76 are fixed to a second inner ring 78a at one end thereof, and are fixed to a second inner ring 78b at the other end thereof.

A second outer ring 80a is provided outside of the second inner ring 78a, and a second outer ring 80b is provided outside of the second inner ring 78b. The second inner rings 78a, 78b and the second outer rings 80a, 80b are fixed respectively to the outer circumferential surface of the second partition plate 60b, and to the inner circumferential surface of the third partition plate 60c.

An annular mixed gas supply chamber 82a is formed between the second inner ring 78a and the second outer ring 80a. A mixed gas of raw fuel and water vapor is supplied to the mixed gas supply chamber 82a. An annular reformed gas discharge chamber 82b is formed between the second inner ring 78b and the second outer ring 80b. The produced fuel gas (reformed gas) is discharged to the reformed gas discharge chamber 82b.

Opposite ends of each of the reforming pipes 76 open respectively into the mixed gas supply chamber 82a and the reformed gas discharge chamber 82b. Reforming catalyst pellets 84 fill inside of each of the reforming pipes 76. Metal meshes 86 are disposed on opposite ends of the reforming pipes 76 for supporting and maintaining the catalyst pellets 84 inside the reforming pipes 76.

A raw fuel supply channel 88 is connected to the mixed gas supply chamber 82a, and a later-described evaporation return pipe 102 is connected to a middle position of the raw fuel supply channel 88. One end of a fuel gas channel 90 is connected to the reformed gas discharge chamber 82b, whereas the other end of the fuel gas channel 90 is connected to the fuel gas supply passage 44a of the fuel cell stack 24 (see FIG. 1).

The evaporator 48 includes evaporation pipes (heat transmission pipes) 92 disposed outside of and around the reformer 46. The evaporation pipes 92 are fixed to a third inner ring 94a at one end thereof, and are fixed to a third inner ring 94b at the other end thereof.

A third outer ring 96a is provided outside of the third inner ring 94a, and a third outer ring 96b is provided outside of the third inner ring 94b. The third inner rings 94a, 94b and the third outer rings 96a, 96b are fixed to the outer circumferential surface of the third partition plate 60c, and to the inner circumferential surface of the fourth partition plate 60d.

An annular water supply chamber 98a is formed between the third inner ring 94a and the third outer ring 96a. Water is supplied to the water supply chamber 98a. An annular water vapor discharge chamber 98b is formed between the third inner ring 94b and the third outer ring 96b. Water vapor is discharged to the water vapor discharge chamber 98b. Opposite ends of the evaporation pipes 92 open into the water supply chamber 98a and the water vapor discharge chamber 98b, respectively.

A water channel 100 is connected to the water supply chamber 98a. One end of the evaporation return pipe 102, which includes at least one evaporation pipe 92, is provided in the water vapor discharge chamber 98b, whereas the other end of the evaporation return pipe 102 is connected to a middle position of the raw fuel supply channel 88 (see FIG. 1). The raw fuel supply channel 88 has an ejector function for generating a negative pressure as a result of the raw fuel flowing therein, for thereby sucking the water vapor.

As shown in FIG. 1, the raw fuel supply apparatus 14 includes a raw fuel channel 104. The raw fuel channel 104 branches through a raw fuel regulator valve 106 into the raw fuel supply channel 88 and the raw fuel supply pipe 58. A desulfurizer 108 for removing sulfur compounds in the city gas (raw fuel) is provided in the raw fuel supply channel 88.

The oxygen-containing gas supply apparatus 16 includes an oxygen-containing gas channel 110. The oxygen-containing gas channel 110 branches through an oxygen-containing gas regulator valve 112 into the oxygen-containing gas supply pipe 72 and the air supply pipe 57. The water supply apparatus 18 is connected to the evaporator 48 through the water channel 100.

Figure 5:
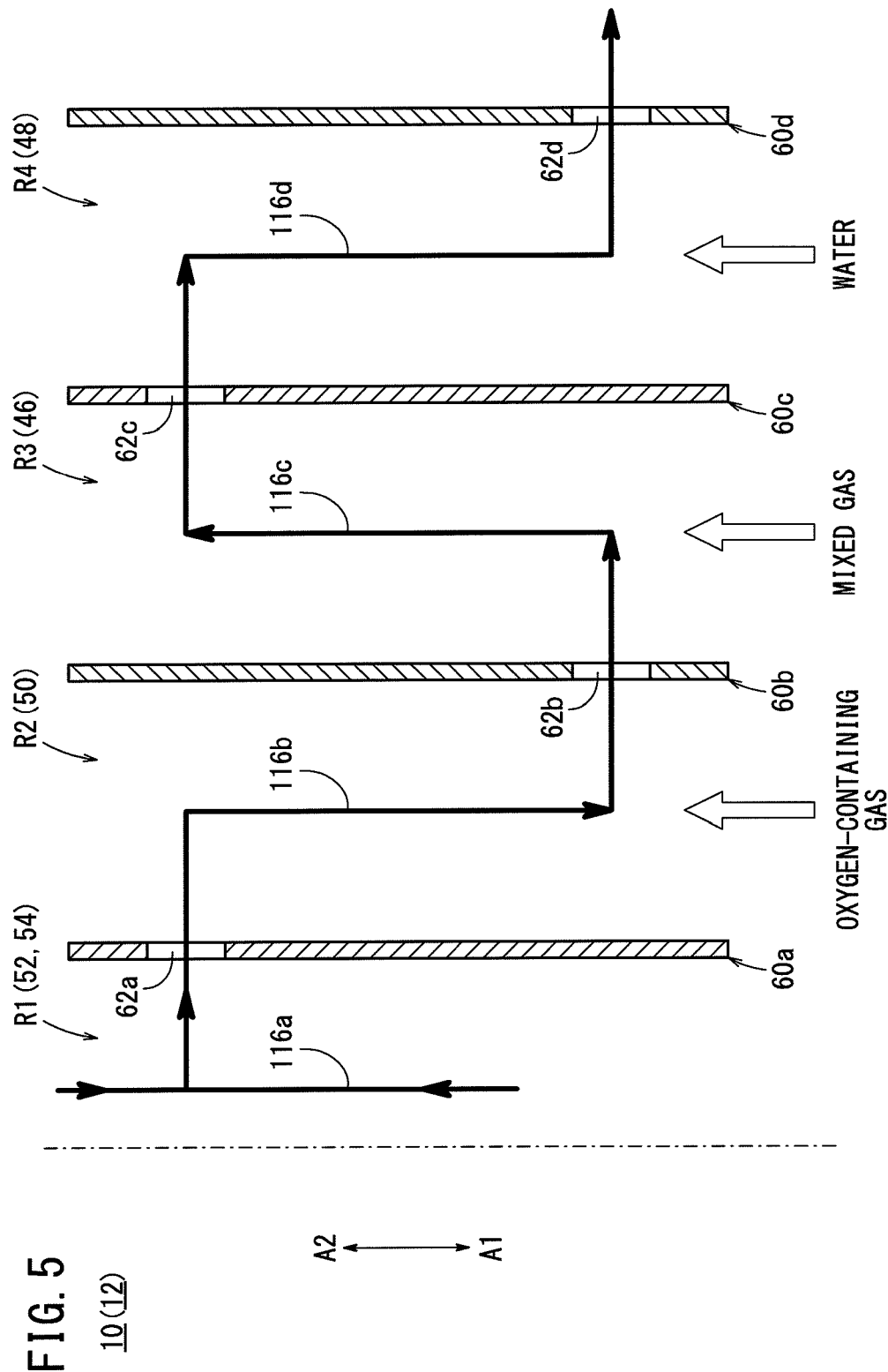
FIG. 5 is a view showing gas flows of a combustion gas in the FC peripheral equipment.

In the first embodiment, as schematically shown in FIG. 5, a first combustion gas channel 116a, which serves as a passage for the combustion gas, is formed in the first area R1, a second combustion gas channel 116b, which serves as a passage for the combustion gas in the direction of the arrow A1, is formed in the second area R2, a third combustion gas channel 116c, which serves as a passage for the combustion gas in the direction of the arrow A2, is formed in the third area R3, and a fourth combustion gas channel 116d, which serves as a passage for the combustion gas in the direction of the arrow A1, is formed in the fourth area R4.

Next, operations of the fuel cell system 10 will be described below.

At the time of starting operation of the fuel cell system 10, air (oxygen-containing gas) and raw fuel are supplied to the start-up combustor 54. Specifically, air is supplied to the oxygen-containing gas channel 110 by the operation of the air pump of the oxygen-containing gas supply apparatus 16. More specifically, air is supplied to the air supply pipe 57 by adjusting the opening angle of the oxygen-containing gas regulator valve 112.

In the meantime, in the raw fuel supply apparatus 14, by operation of the fuel gas pump, for example, raw fuel such as city gas (containing $CH_4$, $C_2H_6$, $C_3H_8$, and $C_4H_{10}$) is supplied to the raw fuel channel 104. Raw fuel is supplied into the raw fuel supply pipe 58 by regulating the opening angle of the raw fuel regulator valve 106. The raw fuel is mixed with air, and is supplied into the start-up combustor 54 (see FIG. 2).

Thus, mixed gas of raw fuel and air is supplied into the start-up combustor 54, and the mixed gas is ignited to start combustion. Therefore, in the exhaust gas combustor 52, which is connected directly to the start-up combustor 54, the combustion gas from the start-up combustor 54 flows into the first partition plate 60a.

As shown in FIG. 5, the plurality of first combustion gas holes 62a are formed at the end of the first partition plate 60a close to the fuel cell stack 24. Thus, combustion gas supplied into the first partition plate 60a passes through the first combustion gas holes 62a, whereupon the combustion gas flows from the first area R1 into the second area R2.

In the second area R2, the combustion gas flows in the direction of the arrow A1, and then the combustion gas flows through the second combustion gas holes 62b formed in the second partition plate 60b and into the third area R3. In the third area R3, the combustion gas flows in the direction of the arrow A2, and then the combustion gas flows through the third combustion gas holes 62c formed in the third partition plate 60c and into the fourth area R4. In the fourth area R4, the combustion gas flows in the direction of the arrow A1, and then the combustion gas is discharged to the exterior through the fourth combustion gas holes 62d formed in the fourth partition plate 60d.

The heat exchanger 50 is provided in the second area R2, the reformer 46 is provided in the third area R3, and the evaporator 48 is provided in the fourth area R4. Thus, combustion gas, which is discharged from the first area R1, heats the heat exchanger 50, then heats the reformer 46, and then heats the evaporator 48.

After the temperature of the fuel cell module 12 has been raised to a predetermined temperature, the oxygen-containing gas is supplied into the heat exchanger 50, and the mixed gas of raw fuel and water vapor is supplied into the reformer 46.

More specifically, the opening angle of the oxygen-containing gas regulator valve 112 is adjusted such that the flow rate of air supplied to the oxygen-containing gas supply pipe 72 is increased. In addition, the opening angle of the raw fuel regulator valve 106 is adjusted such that the flow rate of the raw fuel supplied to the raw fuel supply channel 88 is increased. Further, by operation of the water supply apparatus 18, water is supplied to the water channel 100.

Thus, as shown in FIGS. 2 and 3, air that has flowed into the heat exchanger 50 is temporarily supplied to the oxygen-containing gas supply chamber 70a. While air moves inside the heat exchange pipes 64, the air is heated by means of heat exchange with the combustion gas supplied into the second area R2. After the heated air has temporarily been supplied to the oxygen-containing gas discharge chamber 70b, the air is supplied to the oxygen-containing gas supply passage 42a of the fuel cell stack 24 through the oxygen-containing gas channel 74 (see FIG. 1).

In the fuel cell stack 24, after the heated air has flowed through the oxygen-containing gas flow field 38, the oxygen-containing gas is discharged from the oxygen-containing gas discharge passage 42b and into the oxygen-containing exhaust gas channel 63a. The oxygen-containing exhaust gas channel 63a opens toward the inside of the first partition plate 60a of the exhaust gas combustor 52, so that the oxygen-containing exhaust gas can flow into the first partition plate 60a.

Further, as shown in FIG. 1, water from the water supply apparatus 18 is supplied to the evaporator 48. After sulfur has been removed from the raw fuel at the desulfurizer 108, the raw fuel flows through the raw fuel supply channel 88 and moves toward the reformer 46.

In the evaporator 48, after water has temporarily been supplied to the water supply chamber 98a, while the water moves inside the evaporation pipes 92, the water is heated by means of the combustion gas that flows through the fourth area R4, and the water is vaporized. After water vapor has flowed into the water vapor discharge chamber 98b, the water vapor is supplied to the evaporation return pipe 102, which is connected to the water vapor discharge chamber 98b. Thus, water vapor flows inside the evaporation return pipe 102, and further flows into the raw fuel supply channel 88. Then, the water vapor becomes mixed with the raw fuel to produce the mixed gas.

The mixed gas from the raw fuel supply channel 88 is temporarily supplied to the mixed gas supply chamber 82*a* of the reformer 46. The mixed gas moves inside the reforming pipes 76. In the meantime, the mixed gas is heated by means of the combustion gas that flows through the third area R3. Steam reforming is performed by the catalyst pellets 84. After removal (reforming) of $C_{2+}$ hydrocarbons, a reformed gas chiefly containing methane is obtained.

After the reformed gas is heated, the reformed gas is temporarily supplied as a fuel gas to the reformed gas discharge chamber 82*b*. Thereafter, the fuel gas is supplied to the fuel gas supply passage 44*a* of the fuel cell stack 24 through the fuel gas channel 90 (see FIG. 1).

In the fuel cell stack 24, after the heated fuel gas has flowed through the fuel gas flow field 40, the fuel gas is discharged from the fuel gas discharge passage 44*b* and into the fuel exhaust gas channel 63*b*. The fuel exhaust gas channel 63*b* opens toward the inside of the first partition plate 60*a* of the exhaust gas combustor 52, so that the fuel exhaust gas can be supplied into the first partition plate 60*a*.

Under a heating operation of the start-up combustor 54, when the temperature of the fuel gas in the exhaust gas combustor 52 exceeds the self-ignition temperature, combustion is initiated in the first partition plate 60*a* between the oxygen-containing exhaust gas and the fuel exhaust gas.

In the first embodiment, the FC peripheral equipment 56 includes the first area R1 where the exhaust gas combustor 52 and the start-up combustor 54 are provided, the annular second area R2 disposed around the first area R1 where the heat exchanger 50 is provided, the annular third area R3 disposed around the second area R2 where the reformer 46 is provided, and the annular fourth area R4 disposed around the third area R3 where the evaporator 48 is provided.

More specifically, the annular second area R2 is disposed in the center around the first area R1, the annular third area R3 is disposed around the second area R2, and the annular fourth area R4 is disposed around the third area R3. In such a structure, hot temperature equipment with a large heat demand such as the heat exchanger 50 (and the reformer 46) can be provided on the inside, whereas low temperature equipment with a small heat demand such as the evaporator 48 can be provided on the outside.

For example, the heat exchanger 50 requires a temperature in a range of 550° C. to 650° C., and the reformer 46 requires a temperature in a range of 550° C. to 600° C. Further, the evaporator 48 requires a temperature in a range of 150° C. to 200° C.

Thus, an improvement in heat efficiency is achieved, and a thermally self-sustaining operation is facilitated. Further, a simple and compact structure can be achieved. In particular, since the heat exchanger 50 is provided inside the reformer 46 in an environment where the A/F (air/fuel gas) ratio is relatively low, the reformer 46, which is suitable for carrying out reforming at low temperatures, can be used advantageously.

Further, the first partition plate 60*a*, the second partition plate 60*b*, and the third partition plate 60*c* separate the first area R1, the second area R2, the third area R3, and the fourth area R4, respectively, and the first combustion gas holes 62*a*, the second combustion gas holes 62*b*, and the third combustion gas holes 62*c* are formed in the first partition plate 60*a*, the second partition plate 60*b*, and the third partition plate 60*c*, respectively, for thereby allowing the combustion gas to flow through the first area R1, the second area R2, the third area R3, and the fourth area R4.

In such a structure, blowing of the combustion gas can be suitably suppressed, a further improvement in heat efficiency is achieved, and a thermally self-sustaining operation can reliably be facilitated.

Further, positions of the first combustion gas holes 62*a*, the second combustion gas holes 62*b*, and the third combustion gas holes 62*c* can be determined depending on a priority of any of heat exchange efficiency, durability, and reduction in size or the like with respect to the second, third, and fourth areas R2, R3, R4. Accordingly, a target heat exchange efficiency can be determined freely, and a wider variety of designs becomes available.

In the first embodiment, the heat exchanger 50 is provided in the second area R2, whereas the reformer 46 is provided in the third area R3. The first combustion gas holes 62*a* are disposed adjacent to the end of the first partition plate 60*a* in close proximity to the fuel cell stack 24, and the second combustion gas holes 62*b* are disposed adjacent to the end of the second partition plate 60*b* opposite from the fuel cell stack 24. The third combustion gas holes 62*c* are disposed adjacent to the end of the third partition plate 60*c* in close proximity to the fuel cell stack 24.

Figure 6:
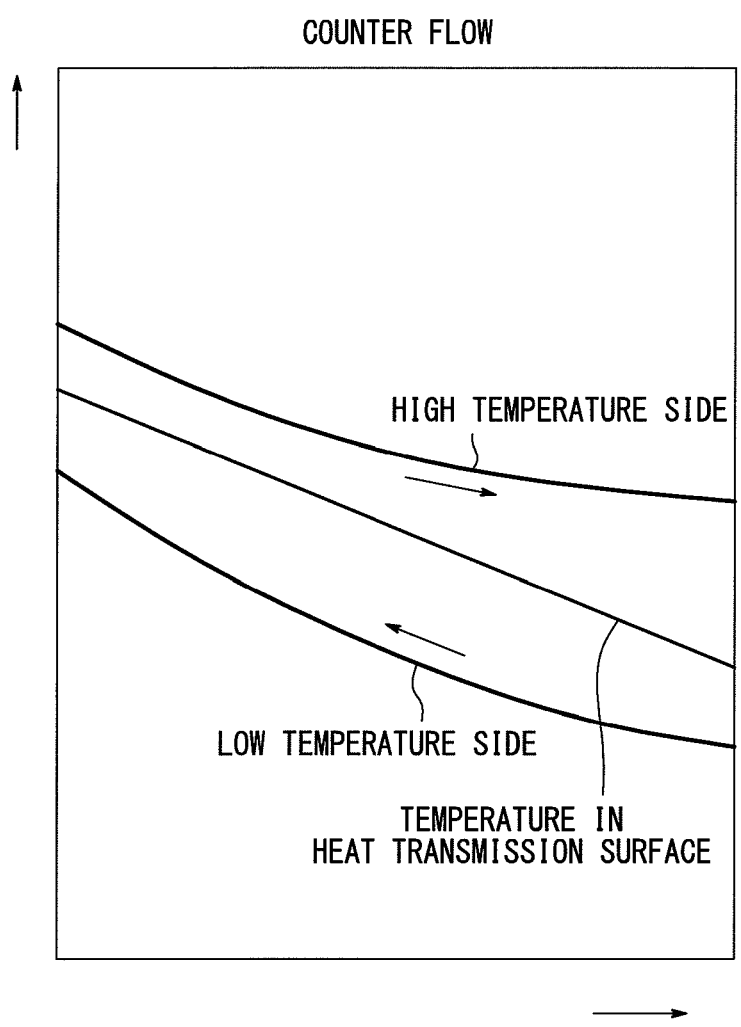
FIG. 6 is a graph showing the temperature at a heat transmission surface where gases flow in a counterflowing manner.

Thus, as shown in FIG. 5, in the second area R2, the flow direction of the oxygen-containing gas, which flows through the heat exchanger 50 in the direction of the arrow A2, is opposite to the flow direction of the combustion gas, as indicated by the arrow A1, i.e., the oxygen-containing gas and the combustion gas flow in a counterflowing manner. Owing to such a counterflow structure, as shown in FIG. 6, heat exchange efficiency is good, and the temperature at the heat transmission surface becomes high. Thus, an improvement in heat exchange efficiency of the heat exchanger 50 can be achieved.

Figure 7:
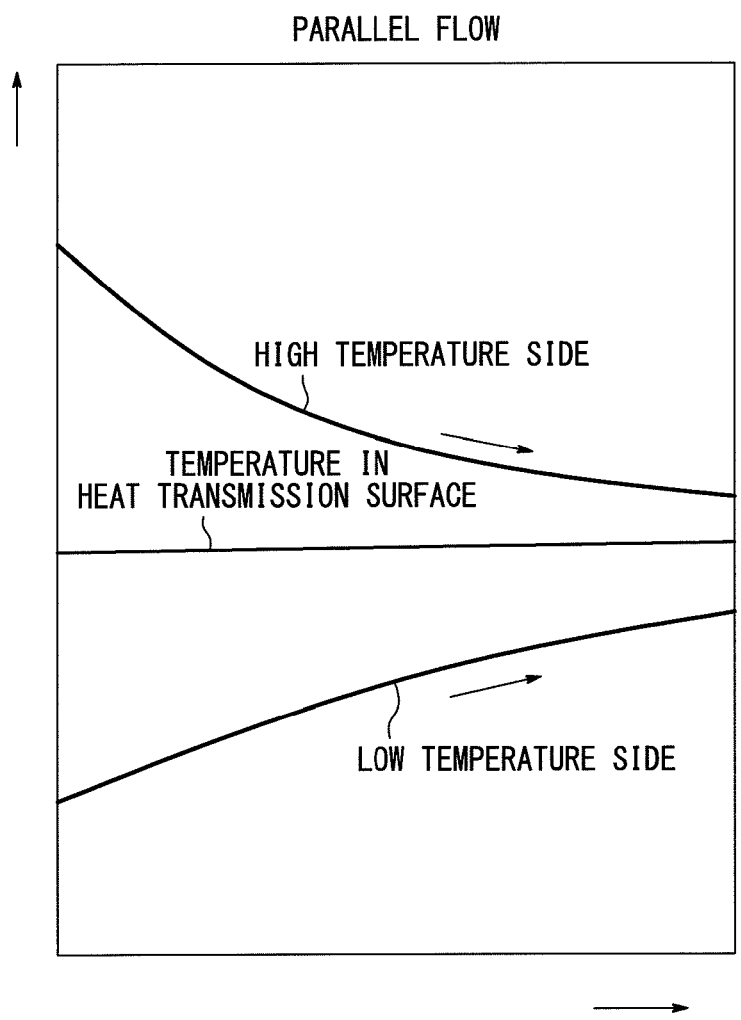
FIG. 7 is a graph showing the temperature at a heat transmission surface where gases flow in parallel with each other.

In the third area R3, the flow direction of the mixed gas that flows through the reformer 46 in the direction of the arrow A2, and the flow direction of the combustion gas, as indicated by the arrow A2, are the same, i.e., the mixed gas and the combustion gas flow in a parallel manner. With such a parallel flow structure, as shown in FIG. 7, the temperature becomes uniform throughout the reformer 46 as a whole, and an improvement in catalyst activity can be achieved. Accordingly, an improvement in heat efficiency is achieved, and a thermally self-sustaining operation is facilitated.

Figure 8:
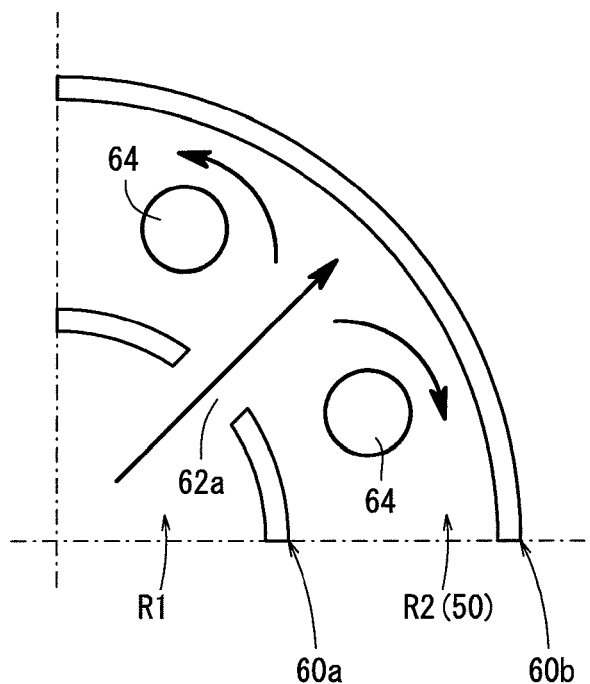
FIG. 8 is a view showing combustion gas holes.

In this regard, as shown in FIG. 8, the first combustion gas holes 62*a*, which are formed in the first partition plate 60*a*, are positioned in confronting relation to the inner wall surface of the second partition plate 60*b*. In such a structure, the combustion gas can flow reliably and sufficiently through the second area R2.

Further, in the first embodiment, as shown in FIGS. 2, 3 and 5, the reformer 46 includes the annular mixed gas supply chamber 82*a*, the annular reformed gas discharge chamber 82*b*, the reforming pipes 76, and the third combustion gas channel 116*c*. Mixed gas is supplied to the mixed gas supply chamber 82*a*, and the produced fuel gas is discharged to the reformed gas discharge chamber 82*b*. The reforming pipes 76 are connected at one end thereof to the mixed gas supply chamber 82*a*, and are connected at the other end thereof to the reformed gas discharge chamber 82*b*. The third combustion gas channel 116*c* supplies the combustion gas into the space between the reforming pipes 76.

The evaporator 48 includes the annular water supply chamber 98*a*, the annular water vapor discharge chamber 98*b*, the evaporation pipes 92, and the fourth combustion gas channel 116*d*. Water is supplied to the water supply chamber 98*a*, and water vapor is discharged to the water vapor discharge chamber 98*b*. The evaporation pipes 92 are connected at one end thereof to the water supply chamber 98a, and are connected at the other end thereof to the water vapor discharge chamber 98b. The fourth combustion gas channel 116d supplies the combustion gas into the space between the evaporation pipes 92.

The heat exchanger 50 includes the annular oxygen-containing gas supply chamber 70a, the annular oxygen-containing gas discharge chamber 70b, the heat exchange pipes 64, and the second combustion gas channel 116b. Oxygen-containing gas is supplied to the oxygen-containing gas supply chamber 70a, and the heated oxygen-containing gas is discharged to the oxygen-containing gas discharge chamber 70b. The heat exchange pipes 64 are connected at one end thereof to the oxygen-containing gas supply chamber 70a, and are connected at the other end thereof to the oxygen-containing gas discharge chamber 70b. The second combustion gas channel 116b supplies the combustion gas into the space between the heat exchange pipes 64.

As described above, the annular supply chambers (mixed gas supply chamber 82a, water supply chamber 98a, and the oxygen-containing gas supply chamber 70a), the annular discharge chambers (reformed gas discharge chamber 82b, water vapor discharge chamber 98b, oxygen-containing gas discharge chamber 70b), and the pipes (reforming pipes 76, evaporation pipes 92, and heat exchange pipes 64) are provided as a basic structure. Thus, a simple structure can easily be achieved. Accordingly, the production cost of the entire fuel cell module 12 is reduced effectively. Further, by changing various parameters, such as the volumes of the supply chambers and the discharge chambers, the length, the diameter, and the number of pipes, a desired operation can be achieved depending on various operating conditions, and a wider variety of designs becomes available.

Further, in the first embodiment, the reformed gas discharge chamber 82b, the water vapor discharge chamber 98b, and the oxygen-containing gas discharge chamber 70b are provided on one end side close to the fuel cell stack 24, whereas the mixed gas supply chamber 82a, the water supply chamber 98a, and the oxygen-containing gas supply chamber 70a are provided on the other end side opposite from the fuel cell stack 24.

In such a structure, reactant gases (fuel gas and oxygen-containing gas), immediately after being raised in temperature and reforming thereof, can be supplied promptly to the fuel cell stack 24. Further, while a decrease in temperature due to radiant heat is minimized, exhaust gas from the fuel cell stack 24 can be supplied to the reformer 46, the evaporator 48, the heat exchanger 50, and the exhaust gas combustor 52 of the FC peripheral equipment 56. Accordingly, an improvement in heat efficiency is achieved, and a thermally self-sustaining operation is facilitated. The phrase "thermally self-sustaining operation" herein implies an operation in which the operating temperature of the fuel cell 22 is maintained using only heat generated in the fuel cell 22 itself, without supplying additional heat from the exterior.

Further, the combustion gas flows through the first combustion gas channel 116a in the first area R1, then through the second combustion gas channel 116b in the second area R2, then through the third combustion gas channel 116c in the third area R3, and then through the fourth combustion gas channel 116d in the fourth area R4. Thereafter, the combustion gas is discharged to the exterior of the fuel cell module 12. Thus, it becomes possible to effectively supply heat to the exhaust gas combustor 52, the heat exchanger 50, the reformer 46, and the evaporator 48 of the FC peripheral equipment 56. Accordingly, an improvement in heat efficiency is achieved, and a thermally self-sustaining operation can be facilitated.

Further, in the evaporator 48, at least one of the evaporation pipes 92 forms an evaporation return pipe 102, which connects the water vapor discharge chamber 98b and the mixed gas supply chamber 82a of the reformer 46. Thus, in a state in which the water vapor is kept hot, the water vapor is mixed with the raw fuel in the mixed gas supply chamber 82a of the reformer 46 to thereby obtain the mixed gas. Accordingly, an improvement in reforming efficiency is achieved.

Further, the fuel cell module 12 is a solid oxide fuel cell module. Therefore, the fuel cell module 12 is applicable to high temperature type fuel cells such as SOFC.

Figure 9:
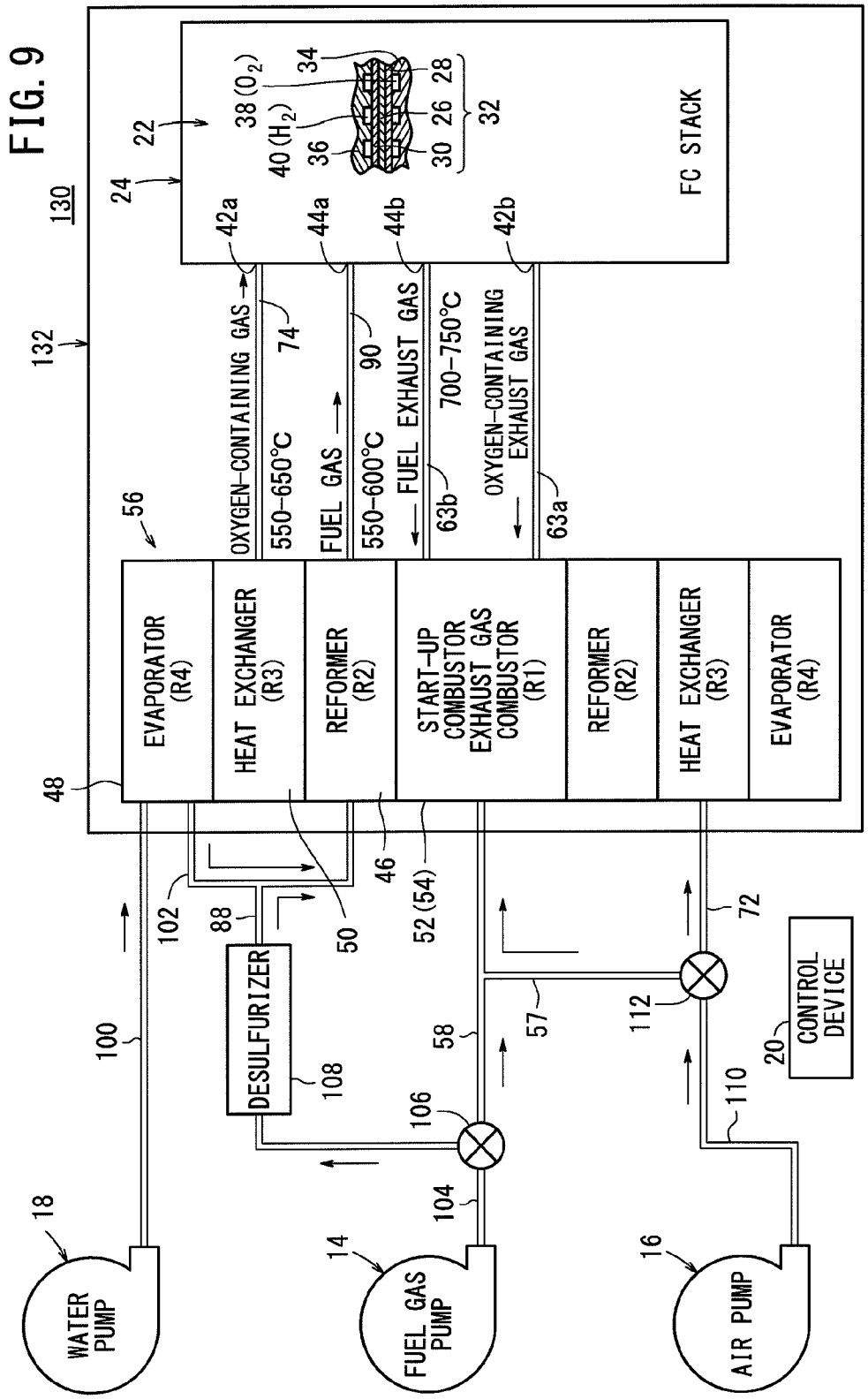
FIG. 9 is a diagram schematically showing the structure of a fuel cell system including a fuel cell module according to a second embodiment of the present invention.

As shown in FIG. 9, a fuel cell system 130 includes a fuel cell module 132 according to a second embodiment of the present invention. Constituent elements of the fuel cell module 132 according to the second embodiment of the present invention, which are identical to those of the fuel cell module 12 according to the first embodiment, are labeled with the same reference numerals, and descriptions of such features are omitted.

Figure 10:
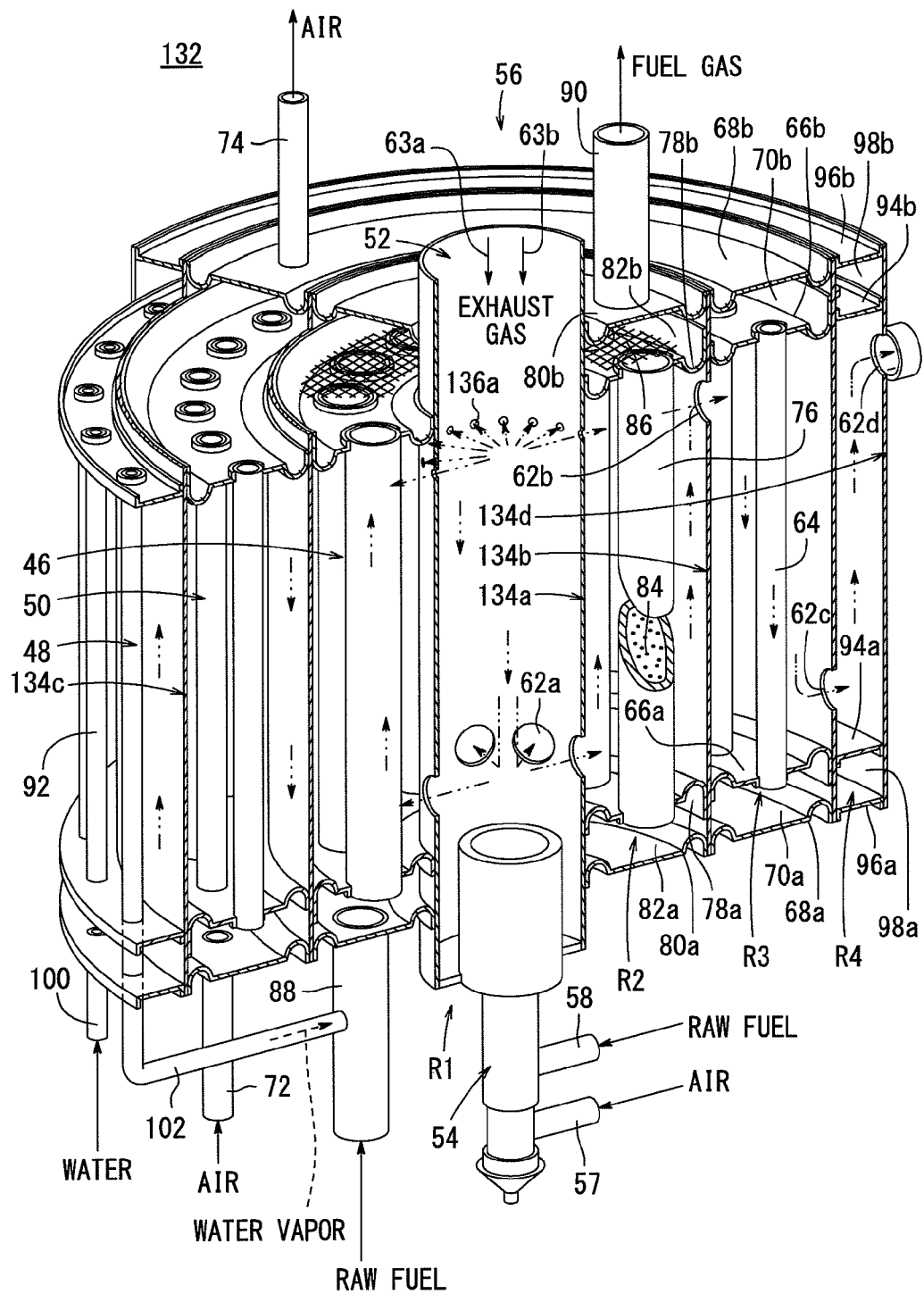
FIG. 10 is a perspective view with partial omission showing FC peripheral equipment of the fuel cell module.

As shown in FIG. 10, the fuel cell module 132 includes a first area R1 comprising, e.g., a circular opening where an exhaust gas combustor 52 and a start-up combustor 54 are provided, an annular second area R2 disposed around the first area R1 where the reformer 46 is provided, an annular third area R3 disposed around the second area R2 where the heat exchanger 50 is provided, and an annular fourth area R4 disposed around the third area R3 where the evaporator 48 is provided.

The FC peripheral equipment 56 includes a first partition plate 134a provided between the first area R1 and the second area R2, a second partition plate 134b provided between the second area R2 and the third area R3, a third partition plate 134c provided between the third area R3 and the fourth area R4, and a fourth partition plate 134d disposed around the fourth area R4.

Figure 11:
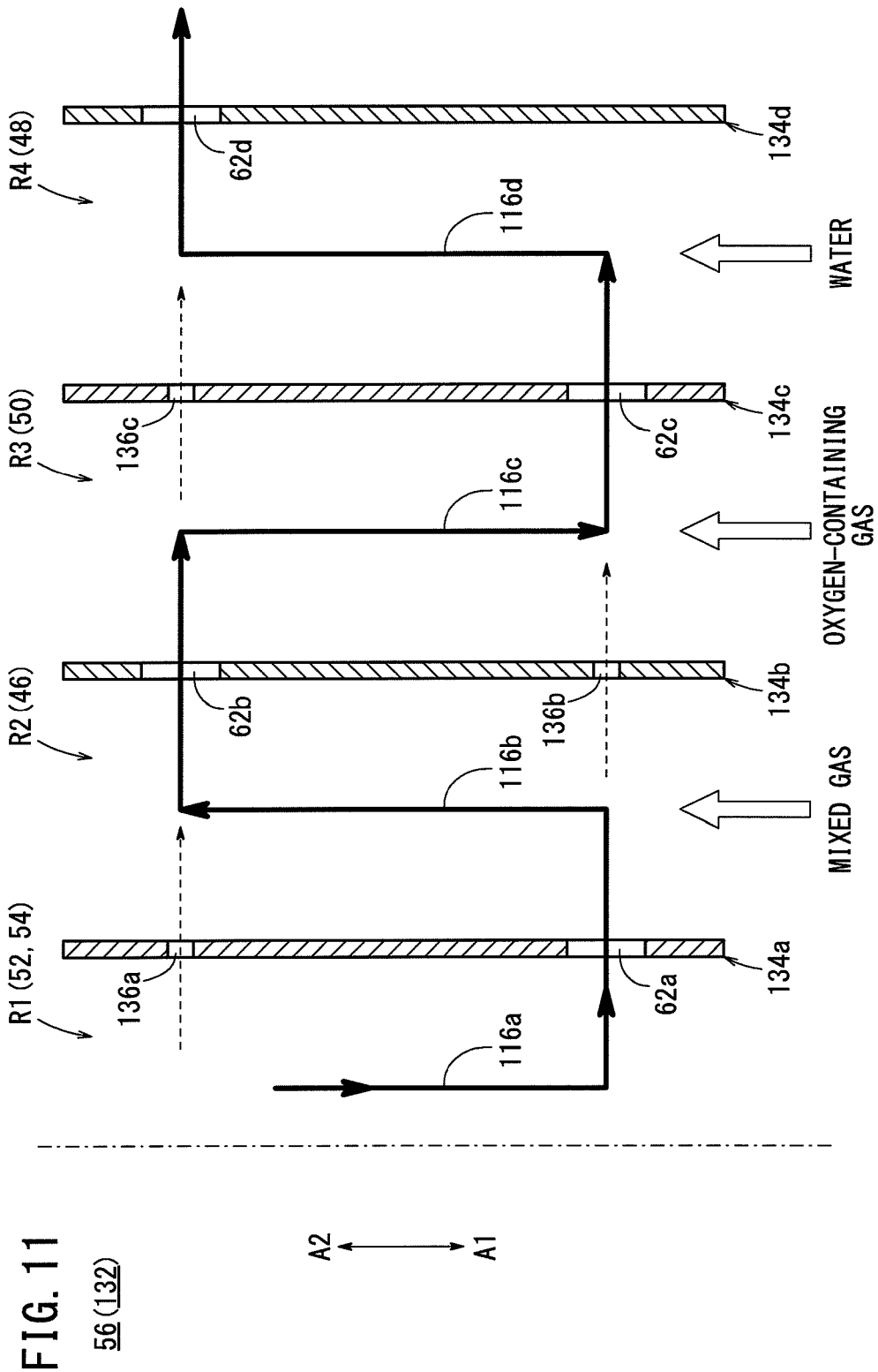
FIG. 11 is a view showing gas flows of a combustion gas in the FC peripheral equipment.

As shown in FIGS. 10 and 11, first combustion gas holes 62a are provided adjacent to an end of the first partition plate 134a opposite from the fuel cell stack 24, second combustion gas holes 62b are provided adjacent to an end of the second partition plate 134b close to the fuel cell stack 24, third combustion gas holes 62c are provided near an end of the third partition plate 134c opposite from the fuel cell stack 24, and fourth combustion gas holes 62d are provided adjacent to an end of the fourth partition plate 134d close to the fuel cell stack 24.

Figure 12:
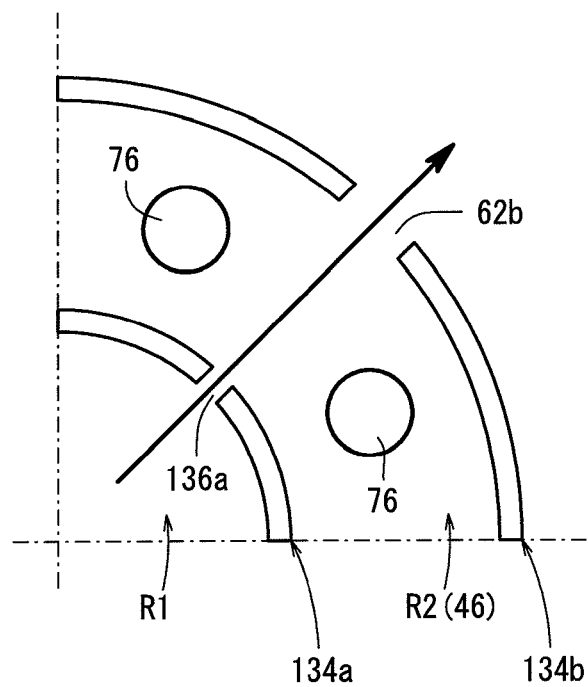
FIG. 12 is a view showing gas extraction holes.
Figure 13:
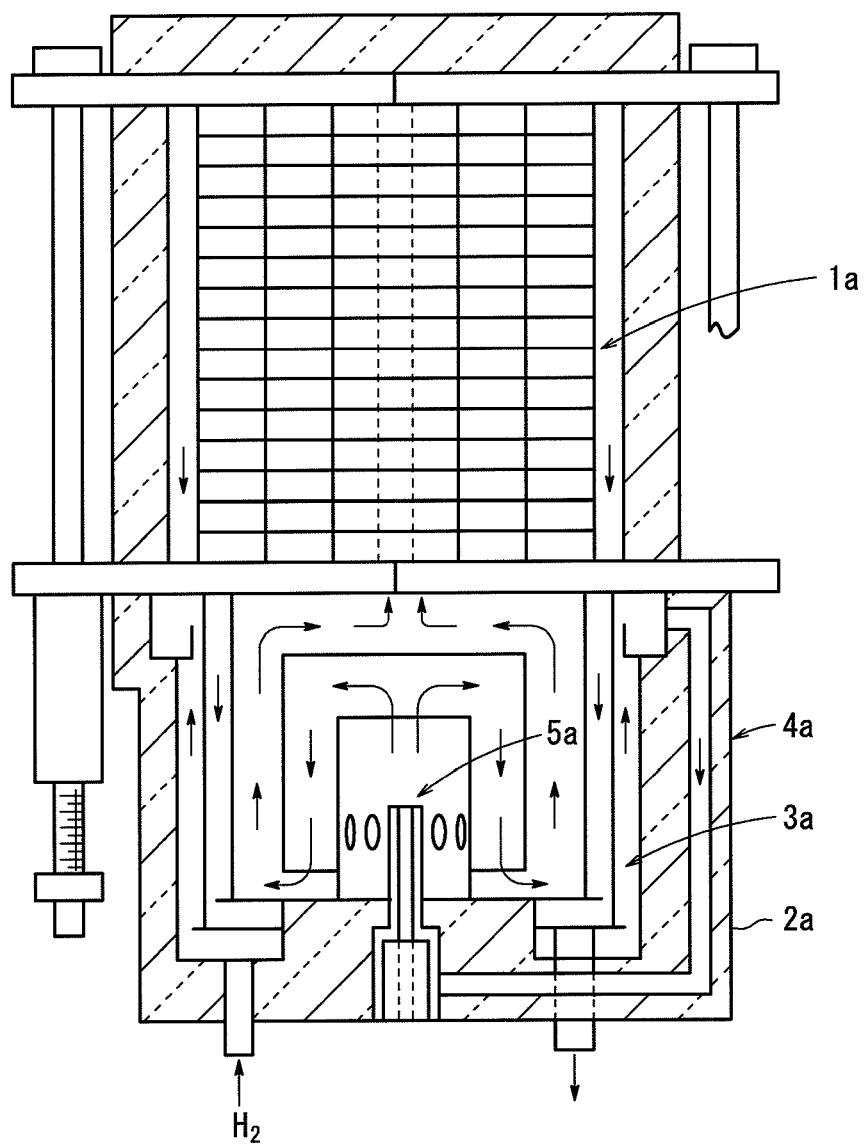
FIG. 13 is a view schematically showing the fuel cell battery disclosed in conventional technique 1.
Figure 14:
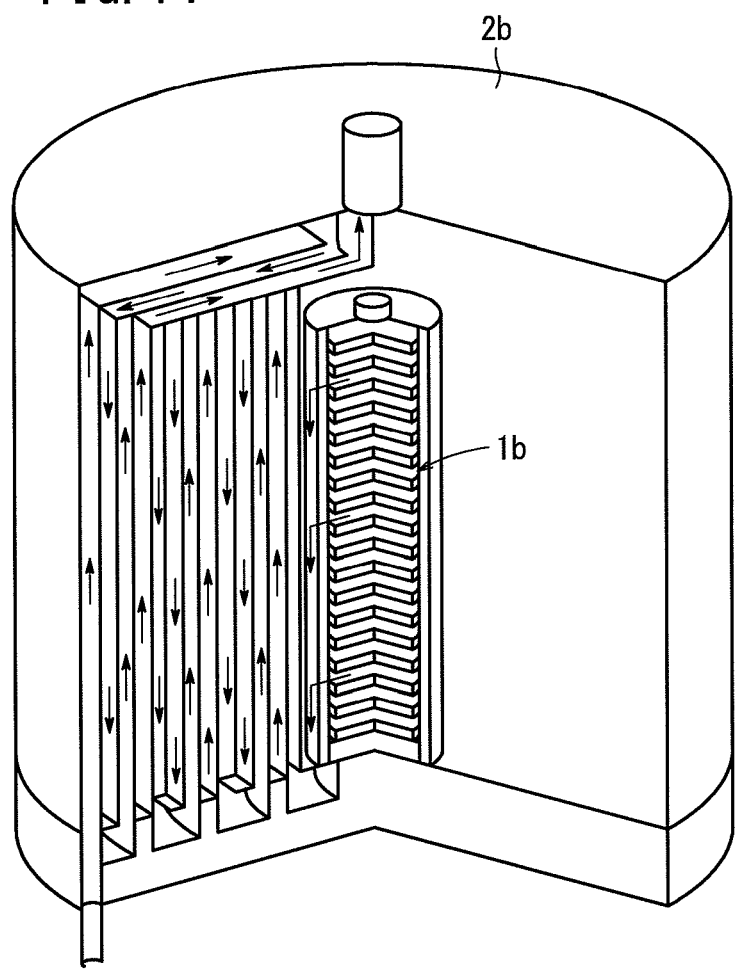
FIG. 14 is a partially cutaway perspective view, showing the solid oxide fuel cell disclosed in conventional technique 2.
Figure 15:
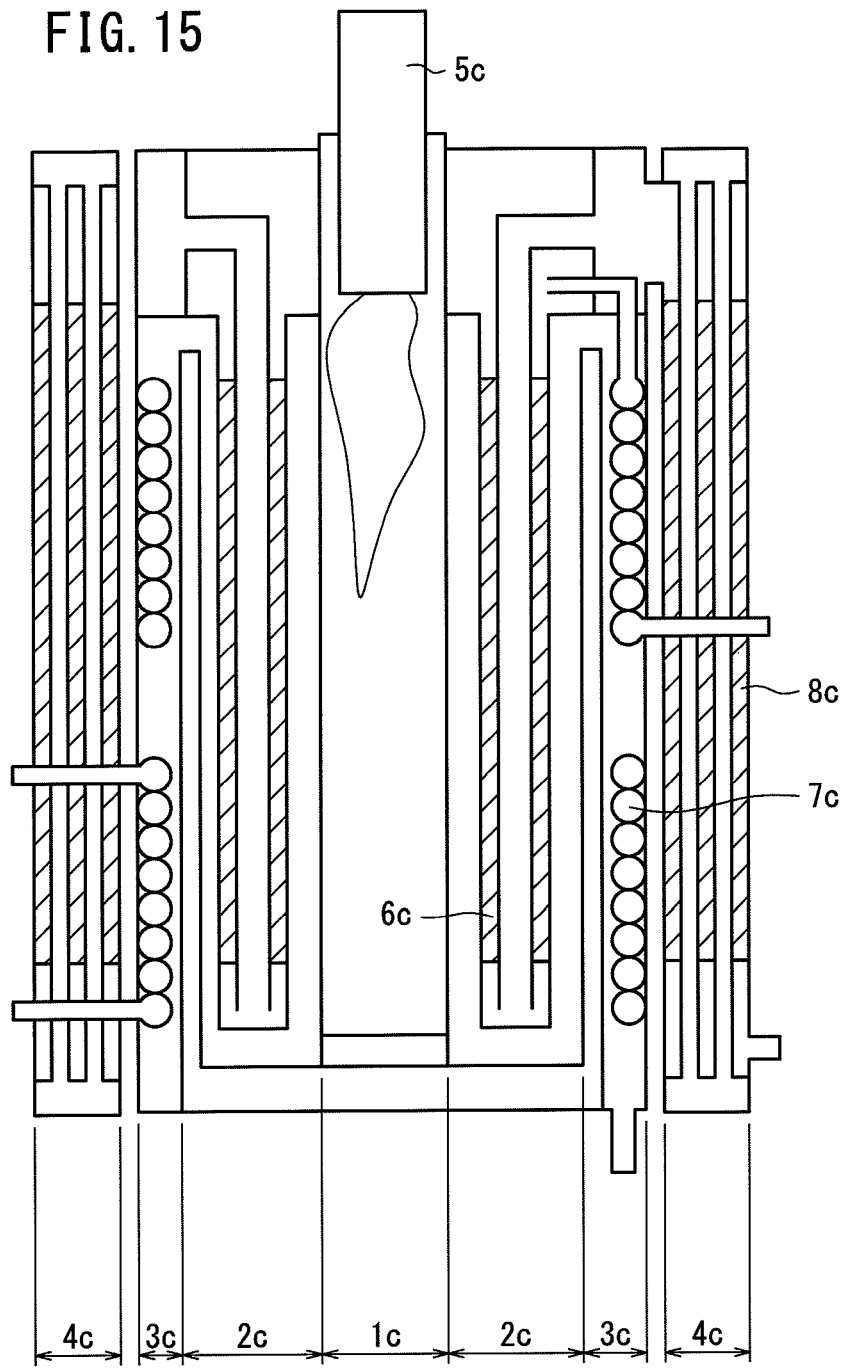
FIG. 15 is a view schematically showing the fuel cell system disclosed in conventional technique 3.

A plurality of gas extraction holes 136a are formed in the first partition plate 134a opposite from the first combustion gas holes 62a. Each of the gas extraction holes 136a has an opening area, which is smaller than each of the opening areas of the first combustion gas holes 62a. As shown in FIGS. 11 and 12, the gas extraction holes 136a are formed at positions confronting the second combustion gas holes 62b formed in the second partition plate 134b. A plurality of gas extraction holes 136b are formed in the second partition plate 134b at positions confronting the third combustion gas holes 62c formed in the third partition plate 134c. A plurality of gas extraction holes 136c are formed in the third partition plate 134c at positions confronting the fourth combustion gas holes 62d formed in the fourth partition plate 134d. The gas extraction holes 136b, 136c are not essential, and may be provided only as necessary.

In the second embodiment, the fuel cell module 132 includes the first area R1 where the exhaust gas combustor 52 and the start-up combustor 54 are provided, the annular second area R2 disposed around the first area R1 where the reformer 46 is provided, the annular third area R3 disposed around the second area R2 where the heat exchanger 50 is provided, and the annular fourth area R4 disposed around the third area R3 where the evaporator 48 is provided.

In this structure, hot temperature equipment with a large heat demand such as the reformer 46 (and the heat exchanger 50) are provided on the inside, and low temperature equipment with a small heat demand such as the evaporator 48 are provided on the outside. Accordingly, an improvement in heat efficiency is achieved, and a thermally self-sustaining operation is facilitated easily. Further, a simple and compact structure is achieved.

Moreover, the first partition plate 134a, the second partition plate 134b, and the third partition plate 134c separate the first area R1, the second area R2, the third area R3, and the fourth area R4 from each other. Further, the first combustion gas holes 62a, the second combustion gas holes 62b, and the third combustion gas holes 62c are formed in the first partition plate 134a, the second partition plate 134b, and the third partition plate 134c, respectively, for thereby allowing the combustion gas to flow through the first area R1, then the second area R2, then the third area R3, and then the fourth area R4.

In this regard, as shown in FIG. 11, in the second area R2, the flow direction of the mixed gas flowing through the reformer 46 in the direction of the arrow A2, and the flow direction of the combustion gas in the direction of the arrow A2 are the same, i.e., the mixed gas and the combustion gas flow in a parallel manner. In the third area R3, the flow direction of the oxygen-containing gas that flows through the heat exchanger 50 in the direction of the arrow A2 is opposite to the flow direction of the combustion gas indicated by the arrow A1, i.e., the oxygen-containing gas and the combustion gas flow in a counterflowing manner.

Further, the gas extraction holes 136a are formed in the first partition plate 134a opposite from the first combustion gas holes 62a. Each of the gas extraction holes 136a has an opening area, which is smaller than the opening areas of the first combustion gas holes 62a. In the presence of the gas extraction holes 136a, a portion of the combustion gas flows from the first area R1, through the second area R2, and into the third area R3. Thus, the quantity of heat required by the heat exchanger 50 in the third area R3 can be supplemented, whereby it is possible to maintain a thermally self-sustaining operation.

Accordingly, in the second embodiment, a further improvement in heat efficiency is achieved, and a thermally self-sustaining operation is facilitated reliably. Further, the same advantages as those of the first embodiment are obtained. For example, the temperature becomes uniform throughout the reformer 46 as a whole, and an improvement in catalyst activity is achieved. Moreover, an improvement in heat exchange efficiency of the heat exchanger 50 is achieved. In particular, since the reformer 46 is provided inside the heat exchanger 50, in an environment where the A/F (air/fuel gas) ratio is relatively high, the reformer 46, which is suitable for reforming at high temperature, can be used advantageously.

Although certain preferred embodiments of the present invention has been shown and described in detail, it should be understood that various changes and modifications may be made therein without departing from the scope of the appended claims.

The invention claimed is:
1. A fuel cell module comprising:
a fuel cell stack formed by stacking fuel cells for generating electricity by electrochemical reactions between a fuel gas and an oxygen-containing gas;
a reformer for reforming a mixed gas of water vapor and a raw fuel chiefly containing hydrocarbon to produce the fuel gas supplied to the fuel cell stack;
an evaporator for evaporating water, and supplying the water vapor to the reformer;
a heat exchanger for raising temperature of the oxygen-containing gas by heat exchange with combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to thereby produce the combustion gas; and
a start-up combustor for combusting the raw fuel and the oxygen-containing gas to thereby produce the combustion gas,
the fuel cell module further comprising:
a first area where the exhaust gas combustor and the start-up combustor are provided;
an annular second area disposed around the first area where one of the reformer and the heat exchanger is provided;
an annular third area disposed around the second area where another of the reformer and the heat exchanger is provided;
an annular fourth area disposed around the third area where the evaporator is provided;
a first partition plate provided between the first area and the second area;
a second partition plate provided between the second area and the third area; and
a third partition plate provided between the third area and the fourth area,
wherein a plurality of first combustion gas holes, a plurality of second combustion gas holes, and a plurality of third combustion gas holes are formed in the first partition plate, the second partition plate, and the third partition plate, respectively, for thereby allowing the combustion gas to flow through the first area, the second area, the third area, and the fourth area,
the plurality of first combustion gas holes are formed in the first area at a first end of an axial direction,
the plurality of second combustion gas holes are formed in the second area at a second end of the axial direction,
the plurality of third combustion gas holes are formed in the third area at the first end of the axial direction,
in the heat exchanger, the oxygen-containing gas and the combustion gas flow in an opposite direction, and
in the reformer, the mixed gas and the combustion gas flow in a same direction.
2. The fuel cell module according to claim 1, wherein the reformer includes an annular mixed gas supply chamber to which the mixed gas is supplied, an annular reformed gas discharge chamber to which the produced fuel gas is discharged, and a plurality of reforming pipes connected at one end to the mixed gas supply chamber, and connected at another end to the reformed gas discharge chamber, and a combustion gas channel for supplying the combustion gas to a space between the reforming pipes;
the evaporator includes an annular water supply chamber to which the water is supplied, an annular water vapor discharge chamber to which the water vapor is dis- charged, a plurality of evaporation pipes connected at one end to the water supply chamber, and connected at another end to the water vapor discharge chamber, and a combustion gas channel for supplying the combustion gas to a space between the evaporation pipes; and the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes connected at one end to the oxygen-containing gas supply chamber, and connected at another end to the oxygen-containing gas discharge chamber, and a combustion gas channel for supplying the combustion gas to a space between the heat exchange pipes.

3. The fuel cell module according to claim 2, wherein the reformed gas discharge chamber, the water vapor discharge chamber, and the oxygen-containing gas discharge chamber are provided on one end side close to the fuel cell stack; and the mixed gas supply chamber, the water supply chamber, and the oxygen-containing gas supply chamber are provided on another end side opposite from the fuel cell stack.

4. The fuel cell module according to claim 3, wherein the combustion gas flows through a combustion gas channel in the first area, then flows from the first combustion gas holes to the combustion gas channel in the second area, then flows from the second combustion gas holes to the combustion gas channel in the third area, and then flows from the third combustion gas holes to the combustion gas channel in the fourth area, and thereafter, the combustion gas is discharged to exterior of the fuel cell module.

5. The fuel cell module according to claim 3, wherein the heat exchanger is provided in the second area, and the reformer is provided in the third area;

the first combustion gas holes are provided adjacent to an end of the first partition plate disposed close to the fuel cell stack;

the second combustion gas holes are provided adjacent to an end of the second partition plate opposite from the fuel cell stack; and the third combustion gas holes are provided adjacent to an end of the third partition plate disposed close to the fuel cell stack.

6. The fuel cell module according to claim 3, wherein the reformer is provided in the second area, and the heat exchanger is provided in the third area;

the first combustion gas holes are provided adjacent to an end of the first partition plate opposite from the fuel cell stack;

the second combustion gas holes are provided adjacent to an end of the second partition plate disposed close to the fuel cell stack; and the third combustion gas holes are provided adjacent to an end of the third partition plate opposite from the fuel cell stack.

7. The fuel cell module according to claim 2, wherein at least one of the evaporation pipes forms an evaporation return pipe, which is connected to the water vapor discharge chamber and the mixed gas supply chamber.

8. The fuel cell module according to claim 1, wherein the fuel cell module is a solid oxide fuel cell module.

* * * * *